United States Patent
King et al.

(10) Patent No.: US 9,085,703 B2
(45) Date of Patent: Jul. 21, 2015

(54) ANTI-BALLING COATING ON DRILL BITS AND DOWNHOLE TOOLS

(71) Applicants: William W. King, Houston, TX (US); Vamsee Chintamaneni, Houston, TX (US)

(72) Inventors: William W. King, Houston, TX (US); Vamsee Chintamaneni, Houston, TX (US)

(73) Assignee: VAREL INTERNATIONAL IND., L.P., Carrollton, TX (US)

( * ) Notice: Subject to any disclaimer, the term of this patent is extended or adjusted under 35 U.S.C. 154(b) by 276 days.

(21) Appl. No.: 13/652,148

(22) Filed: Oct. 15, 2012

(65) Prior Publication Data

US 2014/0102809 A1    Apr. 17, 2014

(51) Int. Cl.
| C09D 7/12 | (2006.01) |
| E21B 41/00 | (2006.01) |
| E21B 10/00 | (2006.01) |
| E21B 10/46 | (2006.01) |

(52) U.S. Cl.
CPC . *C09D 7/12* (2013.01); *E21B 10/00* (2013.01); *E21B 10/46* (2013.01); *E21B 41/00* (2013.01)

(58) Field of Classification Search
CPC ......... E21B 10/46; E21B 10/00; E21B 41/00; E21B 49/10; C09D 7/12; C23C 30/005; F04C 13/008; F04C 2/1071; F04C 2230/91; F04C 2/08
USPC ............... 175/57, 425, 426, 374; 106/287.17, 106/287.18; 264/400; 427/299; 216/39; 416/224; 428/610
See application file for complete search history.

(56) References Cited

U.S. PATENT DOCUMENTS

| RE29,151 E | 3/1977 | McCaleb |
| 4,875,532 A | 10/1989 | Langford |
| 5,330,016 A | 7/1994 | Paske et al. |
| 5,509,490 A | 4/1996 | Paske et al. |
| 6,159,618 A * | 12/2000 | Danroc et al. ............... 428/610 |
| 6,450,271 B1 | 9/2002 | Tibbitts et al. |

(Continued)

FOREIGN PATENT DOCUMENTS

| WO | 2011076350 | 6/2011 |
| WO | 2012089304 | 7/2012 |

OTHER PUBLICATIONS

M. Rujhan Mat et al., Innovative Low-Friction Coating Reduces PDC Balling and Doubles ROP Drilling Shales with WBM, International Association of Drilling Contractors/Society of Petroleum Engineers, Feb. 2002, p. 1-12, IADC/SPE 74514, IADC/SPE Drilling Conference in Dallas, Texas.

Lee Smith et al., Successful Field Application of an Electro-Negative 'Coating' to Reduce Bit Balling Tendencies in Water Based Mud, international Association of Drilling Contractors/Society of Petroleum Engineers, Mar. 1996, pp. 547-557, IADC/SPE 35110, IADC/SPE Drilling Conference in New Orleans, Louisiana.

Young, Lee W, International Search Report and Written Opinion of the International Searching Authority for PCT/US2013/060734, Feb. 21, 2014, pp. 1-11.

*Primary Examiner* — Yong-Suk (Philip) Ro
(74) *Attorney, Agent, or Firm* — King & Spalding LLP

(57) ABSTRACT

A coating that includes a polyisocyanate compound and at least one metal inclusion selected from the group consisting of tungsten and tungsten carbide. The metal inclusions range between about five percent by weight to about fifty percent by weight. A downhole tool that includes a body, a shank positioned at one end of the body, at least one cutter coupled to the body, and a coating coupled to at least a portion of one or more of the body or the shank. The coating includes a polyisocyanate compound and at least one metal inclusion selected from the group consisting of tungsten, tungsten carbide, and aluminum. The metal inclusions range between about five percent by weight to about fifty percent by weight. An intermediate coating is optionally disposed between at least a portion of the coating and at least one of the body or the shank.

32 Claims, 3 Drawing Sheets

(56) References Cited

U.S. PATENT DOCUMENTS

| | | |
|---|---|---|
| 6,651,756 B1 * | 11/2003 | Costo et al. .................. 175/374 |
| 6,809,150 B1 | 10/2004 | LeFave |
| 7,673,679 B2 | 3/2010 | Harrison et al. |
| 2008/0159870 A1 * | 7/2008 | Hong .......................... 416/224 |
| 2011/0174548 A1 | 7/2011 | Patel et al. |
| 2013/0025941 A1 | 1/2013 | Kumar et al. |
| 2013/0180786 A1 | 7/2013 | Thomas et al. |

* cited by examiner

ANTI-BALLING COATING ON DRILL BITS AND DOWNHOLE TOOLS

TECHNICAL FIELD

The present invention is directed generally to drill bits and other downhole tools used in drilling earth formations, such as oil and/or gas wells, and also relates to methods for manufacturing same. More particularly, the present invention is directed to drill bits and other downhole tools having a treatment applied thereon that reduces bit balling and to the methods of applying the treatment.

BACKGROUND

Rotary-type drill bits include both rotary drag bits and roller-cone bits. Conventional rotary drag bits, or fixed cutter bits, typically include one or more blades that extend from a face of the drag bit, at one end, towards an opposite end of the drag bit. These drag bits typically include one or more cutting elements coupled to one or more of the blades. These cutting elements are used to cut through an earth formation during drilling. Adjacently positioned blades typically form a passageway, or junkslot, therebetween which allows for drilling fluid with entrained materials, or formation cuttings, that have been cut from the formation to pass upwardly around the bit and into the borehole above.

Conventional roller-cone bits typically have three cones that are each independently rotatable with respect to the bit body that supports the cones through one or more bearing assemblies. Each cone is mounted onto an end of a respective leg. These cones typically include inserts or integrally formed teeth that are used to cut through a formation during drilling. The spaces provided between the teeth, or inserts, and between the legs of the roller-cone bit provide a passage for drilling fluid and formation cuttings to pass through and enter the borehole above the bit.

When drilling a hole with conventional drill bits, the formation cuttings, over time, generally adhere to, or "ball up" on, the surface of the drill bit. These cuttings tend to accumulate, mechanically and/or chemically, in any void, gap, or recess created between the various structural components of the bit. This phenomenon is particularly enhanced in formations that fail plastically, such as certain shales, mudstones, siltstones, limestones and other ductile formations. In some instances, these formation cuttings become mechanically packed within these voids, gaps, or recesses or even pits or trenches etched into the bit by erosion and abrasion during the drilling process. In some instances, these formation cuttings adhere to the drill bit surface via a chemical bond. For example, when the surface of a bit becomes water wet in certain shale formations, the bit surface and clay layers of the shale, or formation cutting, share common hydrogen electrons thereby producing a chemical bond between the bit surface and the formation cutting. A similar sharing of electrons is present between the individual sheets of the shale itself, thereby allowing formation cuttings to accumulate and chemically bond to other formation cuttings previously adhered onto the bit surface. Adhesion between the formation cuttings and the bit surface also occurs when the charge of the bit face is opposite the charge of the formation, thereby causing an attraction between the two.

From an operations standpoint, bit balling is evidenced by increased pump pressures as the flow pathway through the well bore annulus becomes blocked, reduced rates of penetration, blocked shaker screens, a required over-pull tension that occurs due to a restricted annulus when tripping pipe, and possible stuck pipe. Once bit balling is diagnosed, conventional methods of remediation are to increase the weight on the bit, add chemicals, and perhaps pull the drill pipe out of the hole to clean the bit and bottom hole assembly. For a water-based mud, a detergent may be added to the drilling mud to reduce the ability of the hydrated clay to stick to the bit and bottom hole assembly. Glycol may also be added at about 3% to 4% of system volume. However, these conventional remediation methods often fail to cure this problem.

Preventative measures against bit balling include applying an active charging method to the downhole tool, applying a nitriding method to the downhole tool, and applying a non-water wettable coating to the downhole tool. The active charging method involves application of an electro-negative charge to the downhole tool to repel negatively charged shale particles while drilling and is disclosed in Reissue Pat. No. RE. 29,151, entitled "Repulsing Clays on Drill Bits" and issued on Mar. 15, 1977 to McCaleb, and U.S. Pat. No. 5,509,490, entitled "EMF Sacrificial Anode Sub and Method to Deter Bit Balling" and issued on Apr. 23, 1996 to Paske et al. This method is easily demonstrated with simple lab equipment and is commercially applied in pile driving through shale formations. A corollary to this approach is that it allows for a water film to adhere to the steel, which forms at least a portion of the tool, and interpose between the steel of the tool and the shale cuttings. This active charging method has been shunned for downhole use due to the difficulty of adding a downhole charging system to actively impart a negative charge to one or more of the bottom hole assembly and drill bit.

The nitriding method has been used to impart a residual electro-negative charge to the surface of the steel bodied drill bits and is disclosed in U.S. Pat. No. 5,330,016, entitled "Drill Bit and Other Downhole Tools Having Electro-Negative Surfaces and Sacrificial Anodes to Reduce Mud Balling" and issued on Jul. 19, 1994 to Paske et al., and SPE 35110, entitled "Successful Field Application of an Electro-Negative 'Coating' to Reduce Bit Balling Tendencies in Water Based Mud" and published on March 1996. This method has been relatively successful in field application but involves the added heat treatment ranging from approximately 950° F. to approximately 1050° F., treatment time, and treatment expense involved in gas nitriding. Additionally, portions of the downhole tool and/or drill bit are masked off prior to the application of the gas nitriding, which involves additional time and expense. These portions include, but are not limited to, the portions of the tool or bit where the cutters, cutting elements, inserts, or teeth, are to be brazed.

The non-water wettable coating method aims to slicken the surface of the downhole tools and/or the drill bits and is disclosed in U.S. Pat. No. 6,450,271, entitled "Surface Modifications for Rotary Drill Bits" and issued on Sep. 17, 2002 to Tibbitts et al., and SPE 74514, entitled "Innovative Low-Friction Coating Reduces PDC Balling and Doubles ROP Drilling Shales With WBM" and published on February 2002. This method involves the use of one of the following surface treatments on the downhole tool or drill bit: Teflon®, fluoropolymer, urethanes, epoxies, or plastic filled ceramics. None of these solutions are currently being employed in oilfield drilling beyond their potential inclusion within commercial paint.

In summary, active negative charged systems work but are impractical in oil and gas drilling. Nitriding based negative charged coatings work but are encumbered by time, expense, and manufacturing compromises. "Slickening" methods are not commercially viable due to expense, difficulties of application, poor adhesion, poor erosion resistance, and/or failure to actually reduce balling.

BRIEF DESCRIPTION OF THE DRAWINGS

The foregoing and other features and aspects of the invention are best understood with reference to the following description of certain exemplary embodiments, when read in conjunction with the accompanying drawings, wherein.

Figure 1:
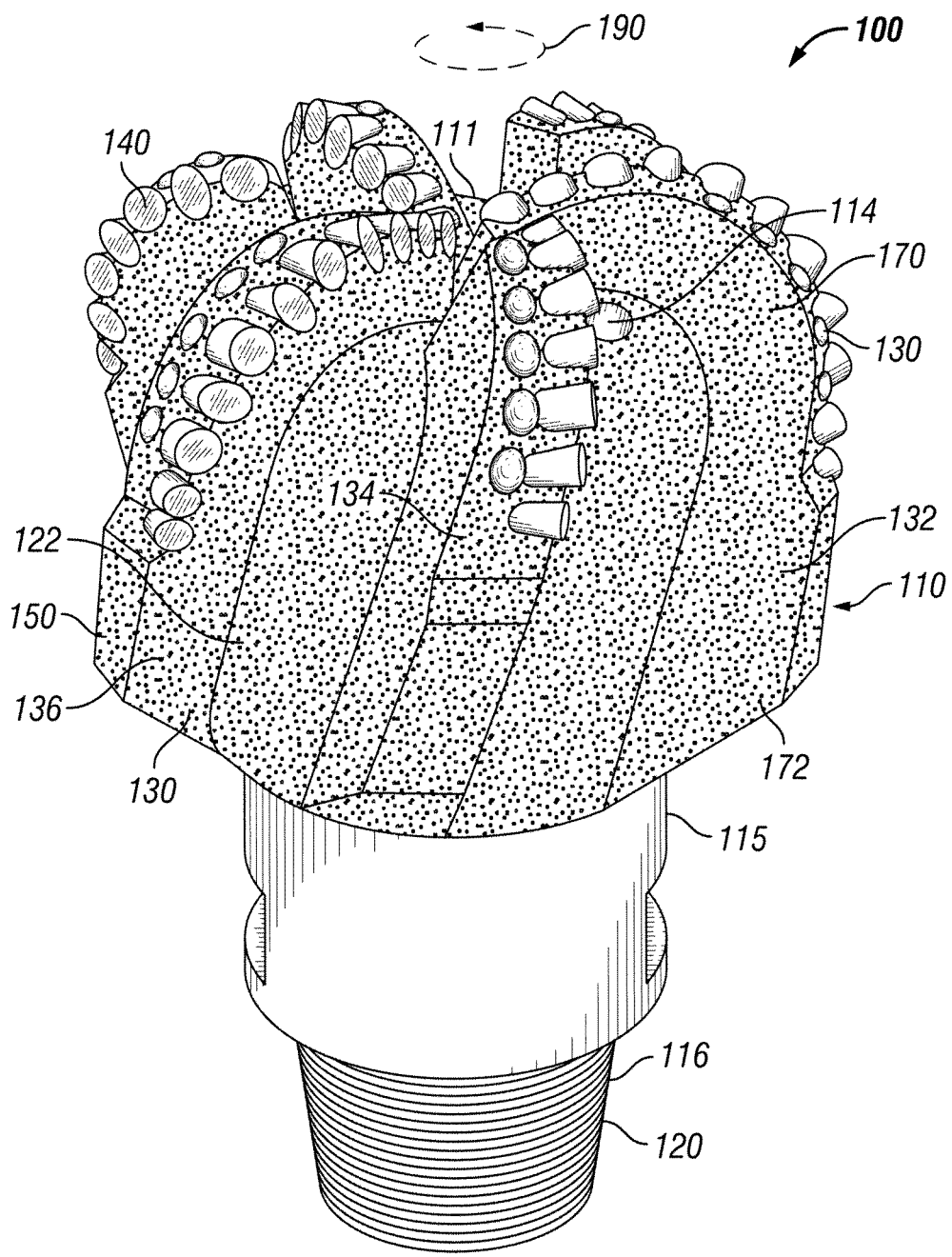
FIG. 1 shows an oblique view of a fixed cutter bit in accordance with an exemplary embodiment of the present invention.

The drawings illustrate only exemplary embodiments of the invention and are therefore not to be considered limiting of its scope, as the invention may admit to other equally effective embodiments.

BRIEF DESCRIPTION OF EXEMPLARY EMBODIMENTS

The present invention is directed generally to drill bits and other downhole tools used in drilling earth formations, such as oil and/or gas wells, and also relates to methods for manufacturing same. More particularly, the present invention is directed to drill bits and other downhole tools having a treatment applied thereon that reduces bit balling and to the methods of applying the treatment Although the description of exemplary embodiments is provided below in conjunction with drill bits, alternate embodiments of the invention may be applicable to other types of downhole tools, such as reamers. The invention is better understood by reading the following description of non-limiting, exemplary embodiments with reference to the attached drawings, wherein like parts of each of the figures are identified by like reference characters, and which are briefly described as follows.

FIG. 1 shows an oblique view of a fixed cutter drill bit 100 in accordance with an exemplary embodiment of the present invention. The fixed cutter drill bit 100 is fabricated using a metal or a metal alloy, such as steel, according to some exemplary embodiments. However, in other exemplary embodiments, the fixed cutter drill bit 100 is fabricated using tungsten carbide and a binder material, such as brass, and forming an infiltrated matrix or using any other suitable materials. Referring to FIG. 1, the fixed cutter drill bit 100, or drill bit, includes a shank 115, a bit body 110, one or more cutters 140, and a coating 170. The shank 115 is coupled to the bit body 110 in certain exemplary embodiments. However, the shank 115 is integrally formed with the bit body 110 in other exemplary embodiments. One or more cutters 140 are inserted into the bit body 110. However, one or more cutters 140 are formed integrally with the bit body 110 in certain exemplary embodiments. The coating 170 is applied onto at least a portion of the surface of the bit body 110 and/or the shank 115. According to the illustrated exemplary embodiment, the coating 170 is applied onto the entire surface of the bit body 110; however, according to alternative exemplary embodiments, the coating 170 is applied to portions of the bit body 110 and/or portions of the shank 115. In certain exemplary embodiments, an intermediate coating (not shown) that adheres to both the surface of the drill bit 100 and to the coating 170 is disposed between the drill bit 100 and the coating 170.

The shank 115 includes a threaded connection 116 at one end 120. The threaded connection 116 couples to a drill string (not shown) or some other equipment that is coupled, either directly or indirectly, to the drill string. The threaded connection 116 is shown to be positioned on the exterior surface of the one end 120. This positioning assumes that the fixed cutter drill bit 100 is coupled to a corresponding threaded connection located on the interior surface of a drill string (not shown) or some other downhole equipment. However, the threaded connection 116 at the one end 120 is alternatively positioned on the interior surface of the one end 120 if the corresponding threaded connection of the drill string (not shown) or downhole equipment is positioned on its exterior surface in other exemplary embodiments. A bore (not shown) is formed longitudinally through the shank 115 and the bit body 110 for communicating drilling fluid from within the drill string to a drill bit face 111 via one or more nozzles 114 during drilling operations.

The bit body 110 includes a plurality of blades 130 extending from the drill bit face 111 of the bit body 110 towards the threaded connection 116. The drill bit face 111 is positioned at one end of the bit body 110 furthest away from the shank 115. The plurality of blades 130 form the cutting surface of the fixed cutter drill bit 100. One or more of these plurality of blades 130 are either coupled to the bit body 110 or are integrally formed with the bit body 110. Each blade 130 includes a face 134, a leading edge 136, and a trailing edge 132. The face 134 extends from a longitudinal end of the leading edge 136 of the blade 130 to a longitudinal end of the trailing edge 132 of the blade 130. The leading edge 136 is facing a direction of rotation 190 of the fixed cutter drill bit 100. A junk slot 122 is formed between each consecutive blade 130, which allows for cuttings and drilling fluid to return to the surface of the wellbore (not shown) once the drilling fluid is discharged from the nozzles 114. Each junk slot 122 is defined by at least the trailing edge 132 of one blade 130 and the leading edge 136 of an adjacent blade 130.

A plurality of cutters 140 are coupled to each of the blades 130 and extend outwardly from the surface of the blades 130 to cut through earth formations when the fixed cutter drill bit 100 is rotated during drilling. The cutters 140 and portions of the bit body 110 deform the earth formation by scraping and/or shearing. The cutting edge of one or more of the plurality of cutters 140 is made from hard cutting elements, such as natural or synthetic diamonds. However, the cutting edge of one or more of the plurality of cutters 140 is made from other suitable materials in other exemplary embodiments. The cutters made from synthetic diamonds are generally known as polycrystalline diamond compact cutters (PDC cutters). Other materials, including, but not limited to, cubic boron nitride (CBN) and thermally stable polycrystalline diamond (TSP), may be used for the cutting edge of the plurality of cutters 140. Although one embodiment of the fixed cutter drill bit has been described, one or more components of the fixed cutter drill bit can be removed, added, or integrated with another component of the fixed cutter drill bit without departing from the scope and spirit of the exemplary embodiment. For example, a gauge section 150 is included in the fixed cutter drill bit 100 and is positioned at the end of one or more blades 130 adjacent to the shank 115. The gauge section 150 is used to define and hold the full diameter of the wellbore that is drilled.

The coating 170 is an anti-balling coating applied onto at least portions of the surface of the drill bit 100. According to some exemplary embodiments, the coating 170 is a polyisocyanate based coating that includes one or more additives 172, or metal inclusions. These additives 172 include at least one of aluminum particles, tungsten particles, and/or tungsten carbide particles. Either one of the previously mentioned additives 172 is used within the coating 170 or a combination of any of the previously mentioned additives 172 is used within the coating 170. Although aluminum particles are used alone in certain exemplary embodiments, many of the exemplary embodiments utilizing aluminum particles as the additive 172 also utilizes at least one of tungsten particles and/or tungsten carbide particles. Tungsten particles and tungsten carbide particles both provide the coating 170 to have greater abrasion and/or erosion resistance. Through testing, it has been determined that any one or a combination of aluminum particles, tungsten particles, and/or tungsten carbide particles provide for a electronegative charge component to the coating 170. Although aluminum particles, tungsten particles, and tungsten carbide particles have been disclosed herein, it is understood that any additive or combination of additives that provides for a electronegative charge component to the coating is used in other exemplary embodiments.

The coating 170 is applied and bonded onto the surfaces of the bit 100, or the tool. According to some exemplary embodiments, the coating 170 is sprayed onto at least portions of the surfaces of the bit 100, or tool. According to other exemplary embodiments, the coating 170 is brushed onto at least portions of the surfaces of the bit 100, or tool. In certain exemplary embodiments, the coating 170 is applied onto the bit 100, or tool, from a reservoir (not shown). The reservoir is agitated to facilitate the suspension of at least the metal inclusions 172 according to some exemplary embodiments. In yet another alternative exemplary embodiment, the bit 100, or tool, is dipped into the coating 170. Although some methods of applying the coating 170 onto the bit 100, or tool, have been briefly mentioned above, other methods known to people having ordinary skill in the art may be used.

According to some exemplary embodiments, the coating 170 is a polyisocyanate based coating, or mixture, that includes at least five percent (5%) metal inclusion by weight up to fifty percent (50%) metal inclusion by weight. According to one exemplary embodiment, the coating 170 includes thirty percent (30%) aluminum particles by weight, zero percent (0%) tungsten particles by weight, and five percent (5%) tungsten carbide particles by weight. According to another exemplary embodiment, the coating 170 includes zero percent (0%) aluminum particles by weight, fifteen percent (15%) tungsten particles by weight, and fifteen percent (15%) tungsten carbide particles by weight. According to a third exemplary embodiment, the coating 170 includes ten percent (10%) aluminum particles by weight, fifteen percent (15%) tungsten particles by weight, and ten percent (10%) tungsten carbide particles by weight. According to a fourth exemplary embodiment, the coating 170 includes ten percent (10%) aluminum particles by weight, fifteen percent (15%) tungsten particles by weight, and twenty percent (20%) tungsten carbide particles by weight. According to yet another exemplary embodiment, the coating 170 includes twenty-five percent (25%) aluminum particles by weight, five percent (5%) tungsten particles by weight, and zero percent (0%) tungsten carbide particles by weight. According to another exemplary embodiment, the coating 170 includes thirty percent (30%) aluminum particles by weight, five percent (5%) tungsten particles by weight, and five percent (5%) tungsten carbide particles by weight. Although percentages have been provided for the coating 170 according to some exemplary embodiments, the percentages of any one of aluminum particles, tungsten particles, and tungsten carbide particles varies in other exemplary embodiments so long that the total metal inclusion within the coating 170 is between about five percent (5%) by weight and about fifty percent (50%) by weight. Hence, the total metal inclusion within the coating 170 is between about ten percent (10%) by weight and about forty percent (40%) by weight in certain exemplary embodiments. Alternatively, the total metal inclusion within the coating 170 is between about twenty percent (20%) by weight and about thirty percent (30%) by weight in certain exemplary embodiments. These are just a few of the examples and it is intended that the weight percentages of the metal inclusion within the coating 170 lies anywhere within the range between about five percent (5%) by weight and about fifty percent (50%) by weight.

The polyisocyanate based coating, once applied onto the bit 100, provides a barrier to moisture, oxygen and other corrosive and erosive effects of environmental agents. The polyisocyanate based coating includes nitrogen, carbon, and oxygen ("NCO") groups, which are able to dehydrate any surface rust, if present, and bond with the underlying steel, or other suitable material, of the bit 100. One of the advantages of having NCO groups within the polyisocyanate based coating is to drive out moisture between the coating 170 and the parent component, or bit 100, so that a better, longer lasting bond is formed therebetween. The NCO groups have the added advantage of making the coating 170 more erosion resistant than traditional paints due to the strength of the bond and extending the duration of the electronegative surface that is present. As previously mentioned, the bit 100, or other downhole tool, is fabricated from steel, a brass bound matrix, or other suitable material. Also, as previously mentioned, the coating 170 is selectively applied to the entire surface of the bit 100, or tool, or to portions of surface of the bit 100, or tool.

Figure 2:
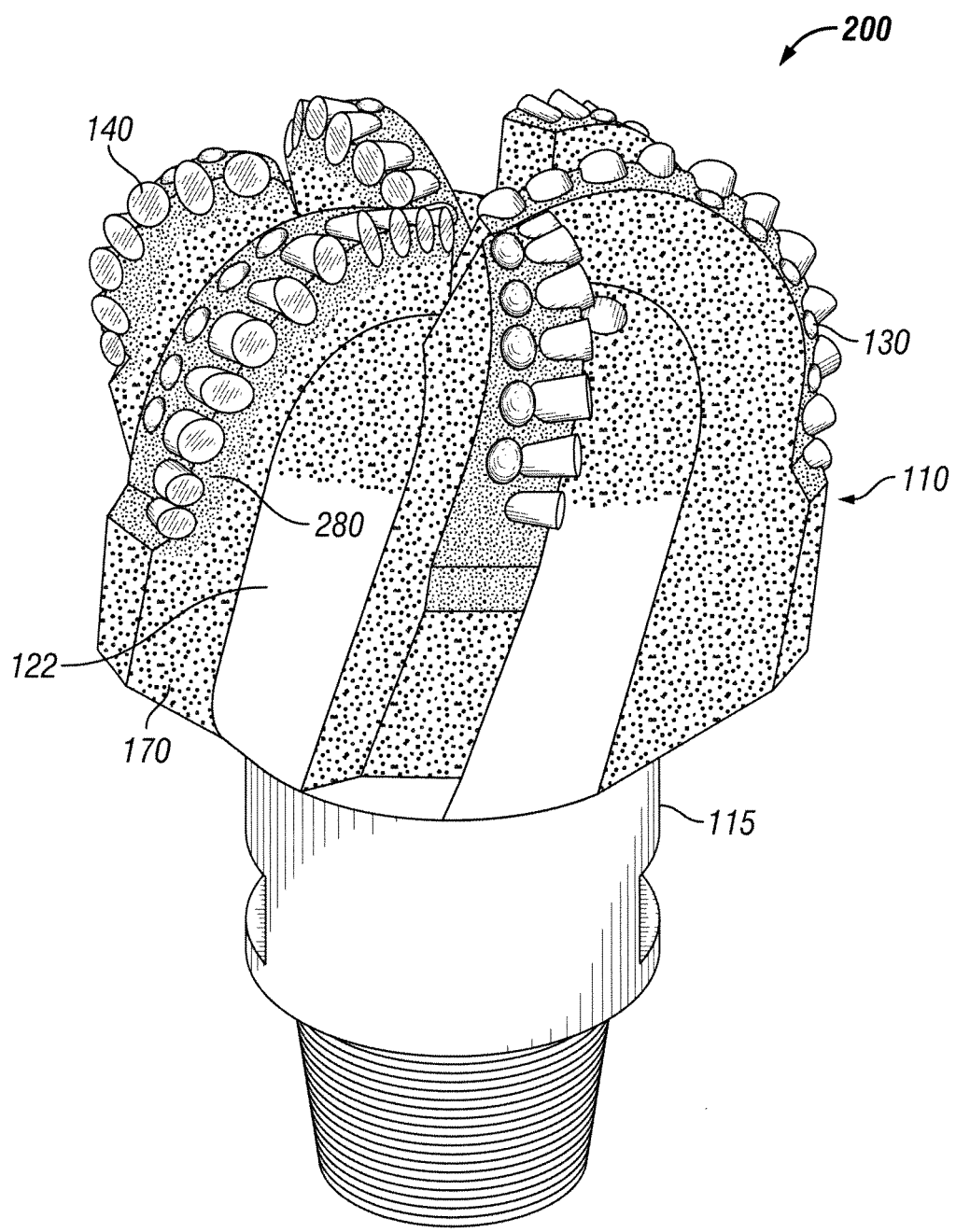
FIG. 2 shows an oblique view of a fixed cutter bit in the process of having a coating applied thereon in accordance with another exemplary embodiment of the present invention.

FIG. 2 shows an oblique view of a fixed cutter bit 200 in the process of having a coating 170 applied thereon in accordance with another exemplary embodiment of the present invention. The fixed cutter drill bit 200 is fabricated using a metal or a metal alloy, such as steel, according to some exemplary embodiments. However, in other exemplary embodiments, the fixed cutter drill bit 200 is fabricated using tungsten carbide and a binder material, such as brass, and forming an infiltrated matrix or using any other suitable materials. Referring to FIG. 2, the fixed cutter drill bit 200, or drill bit, is similar to fixed cutter drill bit 100 (FIG. 1) and includes a shank 115, a bit body 110, one or more cutters 140, and a coating 170. The shank 115, the bit body 110, the cutters 140, and the coating have been previously described with respect to FIG. 1 and therefore is not repeated herein for the sake of brevity. The bit body 110, as previously mentioned with respect to FIG. 1, includes a plurality of blades 130 and a junk slot 122 formed between each consecutive blade 130. However, the fixed cutter drill bit 200 differs from the fixed cutter drill bit 100 (FIG. 1) in that an intermediate coating 280, such as a polyisocyanate based coating without any substantial amount of metal inclusions, is disposed between the bit body 110 and at least portions of the coating 170. An insubstantial amount of metal inclusions is considered to range between zero percent by weight to less than five percent by weight. As illustrated in FIG. 2, the intermediate coating 280 is applied onto at least a portion of the surface of the bit body 110, which includes the surface of the blades 130. The coating 170 is then applied onto the intermediate coating 280 and/or directly to the surface of the bit body 110. Although one intermediate coating 280 is illustrated and described, several different intermediate coatings can be disposed between the coating 170 and the bit body 110 and/or the shank 115. Using an intermediate coating 280 allows for the collective thickness of coatings 170, 280 to be greater at a lesser cost. Further, although not illustrated, the intermediate coating 280 and the coating 170 is applied onto at least a portion of the bit body 110 and at least a portion of the shank 115. The intermediate coating 280 is characterized as a coating that adheres to both the surface of the bit body 110 and/or the shank 115 and the coating 170. According to FIG. 2, once the process of having the coating 170 applied onto the fixed cutter bit 200 is completed, the coating 170 conceals the presently visible intermediate coating 280.

Figure 3:
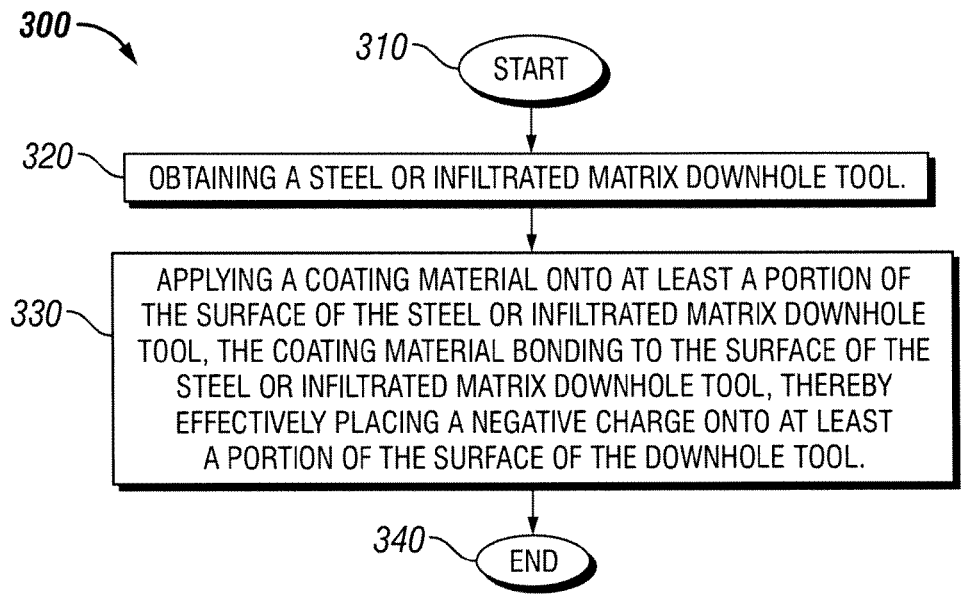
FIG. 3 illustrates a flowchart depicting a coating method that applies a coating material to a surface of a steel or infiltrated matrix downhole tool in accordance with an exemplary embodiment.

FIG. 3 illustrates a flowchart depicting a coating method 300 that applies a coating material to a surface of a steel or infiltrated matrix downhole tool in accordance with an exemplary embodiment. The method 300 starts at step 310. Following step 310, a steel or infiltrated matrix downhole tool is obtained at step 320. One example of the steel or infiltrated matrix downhole tool is the fixed cutter drill bit 100 (FIG. 1), as described and illustrated with respect to FIG. 1; however, the steel or infiltrated matrix downhole tool is a different downhole tool type, such as a reamer or a roller-cone bit, that is fabricated from steel or via infiltration of a binder material, such as brass, according to other exemplary embodiments. Since the fixed cutter drill bit 100 (FIG. 1) has been previously described in detail above, the description is not repeated for the sake of brevity.

After step 320, a coating material is applied onto and bonded to at least a portion of the surface of the steel or infiltrated matrix downhole tool at step 330. This coating material 170 (FIG. 1) has been previously described and hence is not repeated again for the sake of brevity. The coating material 170 (FIG. 1) effectively places a negative charge onto the surface of the steel or infiltrated matrix downhole tool, thereby repelling the shale and other like cuttings and reducing the occurrence of balling on the downhole tool. After step 330, the method 300 ends at step 340.

Figure 4:
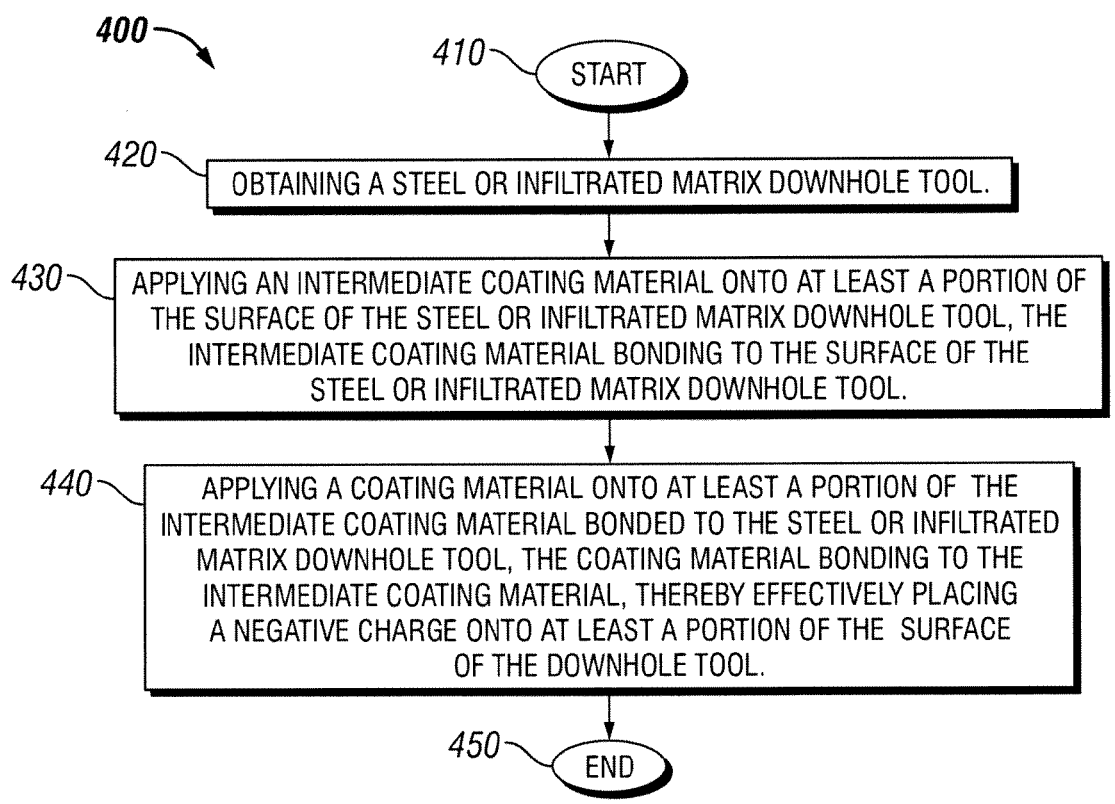
FIG. 4 illustrates a flowchart depicting a coating method that applies a coating material to a surface of a steel or infiltrated matrix downhole tool in accordance with an exemplary embodiment.

FIG. 4 illustrates a flowchart depicting a coating method 400 that applies a coating material to a surface of a steel or infiltrated matrix downhole tool in accordance with an exemplary embodiment. The method 400 starts at step 410. Following step 410, a steel or infiltrated matrix downhole tool is obtained at step 420. One example of the steel or infiltrated matrix downhole tool is the fixed cutter drill bit 200 (FIG. 2), as described and illustrated with respect to FIG. 2; however, the steel or infiltrated matrix downhole tool is a different downhole tool type, such as a reamer or a roller-cone bit, that is fabricated from steel or via infiltration of a binder material, such as brass, according to other exemplary embodiments. Since the fixed cutter drill bit 200 (FIG. 2) has been previously described in detail above, the description is not repeated for the sake of brevity.

After step 420, an intermediate coating material is applied onto and bonded to at least a portion of the surface of the steel or infiltrated matrix downhole tool at step 430. The intermediate coating material 280 (FIG. 2) has been previously described and hence the description is not repeated for the sake of brevity. After step 430, a coating material is applied onto and bonded to at least a portion of the intermediate coating material at step 440. This coating material 170 (FIG. 1) has been previously described and hence is not repeated again for the sake of brevity. The coating material 170 (FIG. 1) effectively places a negative charge onto the surface of the steel or infiltrated matrix downhole tool, thereby repelling the shale and other like cuttings and reducing the occurrence of balling on the downhole tool. After step 440, the method 400 ends at step 450.

Although the above description has been provided with reference to a steel or infiltrated matrix fixed cutter drill bit, other downhole tools, such as reamers and roller-cone bits, fabricated from steel, infiltrated matrix material, or other suitable materials are equally applicable without departing from the scope and spirit of the exemplary embodiments of the present invention. As previously mentioned, the coating 170 bonds well to downhole components, has abrasion and erosion resistant metal admixtures, and carries an electronegative charge which attracts water and repels shale cuttings, thereby limiting or reducing the potential for "balling" of the tool. These attributes enhance the rates of penetration of drill bits and improve the fluid flow around downhole components, including drill bits. The coating is easy to deploy and apply as cosmetic paint products in use on downhole components.

Although each exemplary embodiment has been described in detail, it is to be construed that any features and modifications that are applicable to one embodiment are also applicable to the other embodiments. Furthermore, although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. A coating on downhole tools, comprising:
a downhole tool;
a coating on at least a portion of said downhole tool, said coating comprising;
a polyisocyanate compound; and
at least one metal inclusion selected from the group consisting of tungsten and tungsten carbide,
wherein the metal inclusions range between about five percent by weight of said coating on said at least the portion of said downhole tool to about fifty percent by weight of said coating on said at least the portion of said downhole tool.

2. The coating of claim 1, wherein the at least one metal inclusion comprises tungsten ranging between about five percent by weight of said coating on said at least the portion of said downhole tool to about fifty percent by weight of said coating on said at least the portion of said downhole tool.

3. The coating of claim 2, wherein the tungsten ranges between about five percent by weight of said coating on said at least the portion of said downhole tool to about ten percent by weight of said coating on said at least the portion of said downhole tool.

4. The coating of claim 2, wherein the tungsten ranges between about ten percent by weight of said coating on said at least the portion of said downhole tool to about twenty percent by weight of said coating on said at least the portion of said downhole tool.

5. The coating of claim 2, wherein the tungsten ranges between about twenty percent by weight of said coating on said at least the portion of said downhole tool to about thirty percent by weight of said coating on said at least the portion of said downhole tool.

6. The coating of claim 2, wherein the tungsten ranges between about thirty percent by weight of said coating on said at least the portion of said downhole tool to about forty percent by weight of said coating on said at least the portion of said downhole tool.

7. The coating of claim 2, wherein the tungsten ranges between about forty percent by weight of said coating on said at least the portion of said downhole tool to about fifty percent by weight of said coating on said at least the portion of said downhole tool.

8. The coating of claim 1, wherein the at least one metal inclusion comprises tungsten carbide ranging between about five percent by weight of said coating on said at least the portion of said downhole tool to about fifty percent by weight of said coating on said at least the portion of said downhole tool.

9. The coating of claim 8, wherein the tungsten carbide ranges between about five percent by weight of said coating on said at least the portion of said downhole tool to about ten percent by weight of said coating on said at least the portion of said downhole tool.

10. The coating of claim 8, wherein the tungsten carbide ranges between about ten percent by weight of said coating on said at least the portion of said downhole tool to about twenty percent by weight of said coating on said at least the portion of said downhole tool.

11. The coating of claim 8, wherein the tungsten carbide ranges between about twenty percent by weight of said coating on said at least the portion of said downhole tool to about thirty percent by weight of said coating on said at least the portion of said downhole tool.

12. The coating of claim 8, wherein the tungsten carbide ranges between about thirty percent by weight of said coating on said at least the portion of said downhole tool to about forty percent by weight of said coating on said at least the portion of said downhole tool.

13. The coating of claim 8, wherein the tungsten carbide ranges between about forty percent by weight of said coating on said at least the portion of said downhole tool to about fifty percent by weight of said coating on said at least the portion of said downhole tool.

14. The coating of claim 1, wherein the at least one metal inclusion further comprises aluminum.

15. The coating of claim 1, wherein the at least one metal inclusion comprises tungsten and tungsten carbide, the tungsten and tungsten carbide collectively ranging between about five percent by weight of said coating on said at least the portion of said downhole tool to about fifty percent by weight of said coating on said at least the portion of said downhole tool.

16. A downhole tool, comprising:
a body;
a shank positioned at one end of the body;
at least one cutter coupled to the body; and
a coating coupled to at least a portion of one or more of the body or the shank, the coating comprising:
a polyisocyanate compound; and
at least one metal inclusion selected from the group consisting of tungsten, tungsten carbide, and aluminum,
wherein the metal inclusions range between about five percent by weight of said coating coupled to said at least the portion of the body or the shank to about fifty percent by weight of said coating coupled to said at least the portion of the body or the shank.

17. The downhole tool of claim 16, wherein the at least one metal inclusion comprises tungsten ranging between about five percent by weight of said coating coupled to said at least the portion of the body or the shank to about fifty percent by weight of said coating coupled to said at least the portion of the body or the shank.

18. The downhole tool of claim 16, wherein the at least one metal inclusion comprises tungsten carbide ranging between about five percent by weight of said coating coupled to said at least the portion of the body or the shank to about fifty percent by weight of said coating coupled to said at least the portion of the body or the shank.

19. The downhole tool of claim 16, wherein the at least one metal inclusion comprises aluminum ranging between about five percent by weight of said coating coupled to said at least the portion of the body or the shank to about fifty percent by weight of said coating coupled to said at least the portion of the body or the shank.

20. The downhole tool of claim 16, wherein the at least one metal inclusion comprises tungsten and tungsten carbide, the tungsten and tungsten carbide collectively ranging between about five percent by weight of said coating coupled to said at least the portion of the body or the shank to about fifty percent by weight of said coating coupled to said at least the portion of the body or the shank.

21. The downhole tool of claim 16, wherein the at least one metal inclusion comprises tungsten and aluminum, the tungsten and aluminum collectively ranging between about five percent by weight of said coating coupled to said at least the portion of the body or the shank to about fifty percent by weight of said coating coupled to said at least the portion of the body or the shank.

22. The downhole tool of claim 16, wherein the at least one metal inclusion comprises tungsten carbide and aluminum, the tungsten carbide and aluminum collectively ranging between about five percent by weight of said coating coupled to said at least the portion of the body or the shank to about fifty percent by weight of said coating coupled to said at least the portion of the body or the shank.

23. The downhole tool of claim 16, wherein the at least one metal inclusion comprises tungsten, tungsten carbide, and aluminum, the tungsten, tungsten carbide and aluminum collectively ranging between about five percent by weight of said coating coupled to said at least the portion of the body or the shank to about fifty percent by weight of said coating coupled to said at least the portion of the body or the shank.

24. The downhole tool of claim 16, wherein the body is fabricated from steel or an infiltrated matrix.

25. A downhole tool, comprising:
a body;
a shank positioned at one end of the body;
at least one cutter coupled to the body;
an intermediate coating coupled to at least a portion of one or more of the body or the shank; and
a coating coupled to at least a portion of the intermediate coating, the coating comprising:

a polyisocyanate compound; and at least one metal inclusion selected from the group consisting of tungsten, tungsten carbide, and aluminum, wherein the metal inclusions range between about five percent by weight of said coating coupled to said at least the portion of the intermediate coating to about fifty percent by weight of said coating coupled to said at least the portion of the intermediate coating.

26. The downhole tool of claim 25, wherein the at least one metal inclusion comprises tungsten ranging between about five percent by weight of said coating coupled to said at least the portion of the intermediate coating to about fifty percent by weight of said coating coupled to said at least the portion of the intermediate coating.

27. The downhole tool of claim 25, wherein the at least one metal inclusion comprises tungsten carbide ranging between about five percent by weight of said coating coupled to said at least the portion of the intermediate coating to about fifty percent by weight of said coating coupled to said at least the portion of the intermediate coating.

28. The downhole tool of claim 25, wherein the at least one metal inclusion comprises aluminum ranging between about five percent by weight of said coating coupled to said at least the portion of the intermediate coating to about fifty percent by weight of said coating coupled to said at least the portion of the intermediate coating.

29. The downhole tool of claim 25, wherein the at least one metal inclusion comprises tungsten and tungsten carbide, the tungsten and tungsten carbide collectively ranging between about five percent by weight of said coating coupled to said at least the portion of the intermediate coating to about fifty percent by weight of said coating coupled to said at least the portion of the intermediate coating.

30. The downhole tool of claim 25, wherein the at least one metal inclusion comprises tungsten and aluminum, the tungsten and aluminum collectively ranging between about five percent by weight of said coating coupled to said at least the portion of the intermediate coating to about fifty percent by weight of said coating coupled to said at least the portion of the intermediate coating.

31. The downhole tool of claim 25, wherein the at least one metal inclusion comprises tungsten carbide and aluminum, the tungsten carbide and aluminum collectively ranging between about five percent by weight of said coating coupled to said at least the portion of the intermediate coating to about fifty percent by weight of said coating coupled to said at least the portion of the intermediate coating.

32. The downhole tool of claim 25, wherein the at least one metal inclusion comprises tungsten, tungsten carbide, and aluminum, the tungsten, tungsten carbide and aluminum collectively ranging between about five percent by weight of said coating coupled to said at least the portion of the intermediate coating to about fifty percent by weight of said coating coupled to said at least the portion of the intermediate coating.

* * * * *